United States Patent

Lincoln et al.

[11] Patent Number: 6,067,459
[45] Date of Patent: May 23, 2000

[54] DISPLAY MAGNIFIER

[76] Inventors: Tevis A. Lincoln; Terriance A. Spiller, Sr., both of 3990 Cheryl St., Beaumont, Tex. 77713

[21] Appl. No.: 08/960,975

[22] Filed: Oct. 30, 1997

[51] Int. Cl.[7] ............................................. H04B 1/38

[52] U.S. Cl. .................................... 455/566; 455/575

[58] Field of Search ................................ 455/550, 566, 455/575, 90, 347, 351; 359/440, 896

[56] References Cited

U.S. PATENT DOCUMENTS 5,867,795  2/1999  Novis et al. .......................... 455/566

Primary Examiner—Thanh Cong Le

[57] ABSTRACT

A magnification system is provided including a display mounted on a cellular phone or the like. Also included is a frame with a transparent magnifying lens mounted therein. An adhesive lining is secured to an entire bottom surface of the frame. As such, the frame may be secured about a periphery of the display such that the lens resides above the same to magnify the numbers displayed thereon.

9 Claims, 2 Drawing Sheets

DISPLAY MAGNIFIER

BACKGROUND OF THE INVENTION

1. Field of the Invention

The present invention relates to magnifying lenses and more particularly pertains to a new display magnifier for aiding an elderly user in reading a liquid crystal display.

2. Description of the Prior Art

The use of magnifying lenses is known in the prior art. More specifically, magnifying lenses heretofore devised and utilized are known to consist basically of familiar, expected and obvious structural configurations, notwithstanding the myriad of designs encompassed by the crowded prior art which have been developed for the fulfillment of countless objectives and requirements.

Known prior art magnifying lenses include U.S. Pat. No. 4,551,117; U.S. Pat. No. 5,075,799; U.S. Pat. No. 5,153,619; U.S. Pat. No. 4,709,657; U.S. Pat. No. 4,012,127; and U.S. Pat. No. Des. 333,146.

In these respects, the display magnifier according to the present invention substantially departs from the conventional concepts and designs of the prior art, and in so doing provides an apparatus primarily developed for the purpose of magnifying lenses.

SUMMARY OF THE INVENTION

In view of the foregoing disadvantages inherent in the known types of magnifying lenses now present in the prior art, the present invention provides a new display magnifier construction wherein the same can be utilized for aiding an elderly user in reading a liquid crystal display.

The general purpose of the present invention, which will be described subsequently in greater detail, is to provide a new display magnifier apparatus and method which has many of the advantages of the magnifying lenses mentioned heretofore and many novel features that result in a new display magnifier which is not anticipated, rendered obvious, suggested, or even implied by any of the prior art magnifying lenses, either alone or in any combination thereof.

To attain this, the present invention generally comprises a cellular phone having a rectangular configuration with a front face, a rear face, and thin periphery formed therebetween. The front face has a generally rectangular liquid crystal display mounted thereon for displaying phone numbers dialed. In alternate embodiments, the display is situated on a pager, caller identification box, or the like. Next provided is a frame having a rectangular configuration defined by an elongated top and bottom member and a pair of short side members mounted therebetween. Each member has a common vertical cross-section, an inner surface, an outer surface, a top surface, and a bottom surface. FIG. 2 shows a transparent magnifying lens having a top surface, a bottom surface, and a periphery formed therebetween which has a rectangular configuration. The periphery of the lens is coupled along the inner surface of each member of the frame. The top and bottom surfaces each define a portion of cylinder whose axis runs parallel along a length of the display. A central extent of the top and bottom surfaces define a common thickness along a length of the lens. It should be noted that such thickness is equal to a height of the frame. Finally, an adhesive lining is positioned along an entire bottom surface of each of the members of the frame. By this structure, the frame may be secured about a periphery of the display such that the lens resides above the same to magnify the numbers displayed thereon.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new display magnifier apparatus and method which has many of the advantages of the magnifying lenses mentioned heretofore and many novel features that result in a new display magnifier which is not anticipated, rendered obvious, suggested, or even implied by any of the prior art magnifying lenses, either alone or in any combination thereof.

It is another object of the present invention to provide a new display magnifier which may be easily and efficiently manufactured and marketed.

It is a further object of the present invention to provide a new display magnifier which is of a durable and reliable construction.

An even further object of the present invention is to provide a new display magnifier which is susceptible of a low cost of manufacture with regard to both materials and labor, and which accordingly is then susceptible of low prices of sale to the consuming public, thereby making such display magnifier economically available to the buying public.

Still yet another object of the present invention is to provide a new display magnifier which provides in the apparatuses and methods of the prior art some of the advantages thereof, while simultaneously overcoming some of the disadvantages normally associated therewith.

Still another object of the present invention is to provide a new display magnifier for aiding an elderly user in reading a liquid crystal display.

Even still another object of the present invention is to provide a new display magnifier that includes a display mounted on a cellular phone or the like. Also included is a frame with a transparent magnifying lens mounted therein. An adhesive lining is secured to an entire bottom surface of the frame. As such, the frame may be secured about a periphery of the display such that the lens resides above the same to magnify the numbers displayed thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
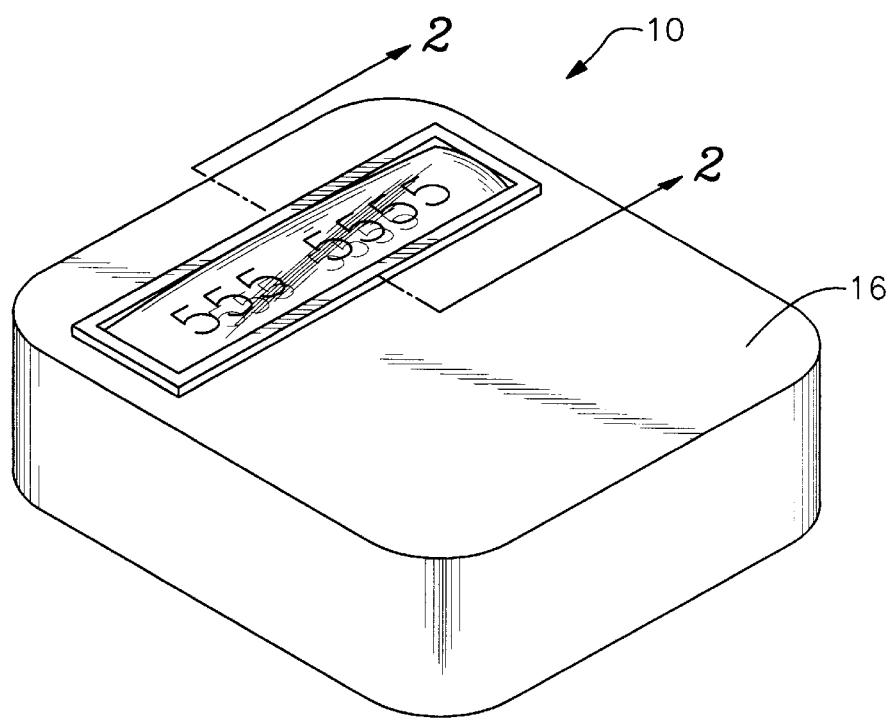
FIG. 1 is a perspective view of a new display magnifier according to the present invention.

With reference now to the drawings, and in particular to FIGS. 1 through 4 thereof, a new display magnifier embodying the principles and concepts of the present invention and generally designated by the reference numeral 10 will be described.

The present invention, as designated as numeral 10, includes a cellular phone 12 having a rectangular configuration with a front face, a rear face, and thin periphery formed therebetween. The front face has a generally rectangular liquid crystal display 14 mounted thereon for displaying phone numbers dialed. In alternate embodiments, the display is situated on a pager 16, caller identification box 18, or the like.

Next provided is a frame 20 having a rectangular configuration defined by an elongated top and bottom member and a pair of short side members mounted therebetween. Each member has a common rectangular vertical cross-section. Further, each member has an inner surface 22, an outer surface 24, a top surface, and a bottom surface.

Figure 2:
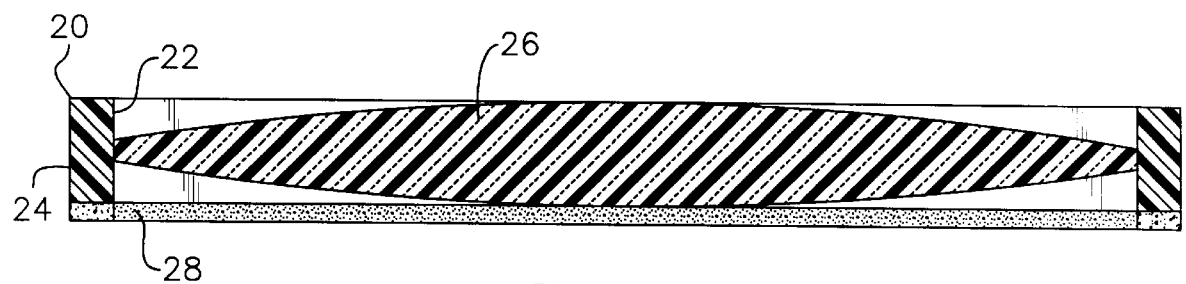
FIG. 2 is a cross-sectional view of the present invention taken along line 2—2 shown in FIG. 1.
Figure 3:
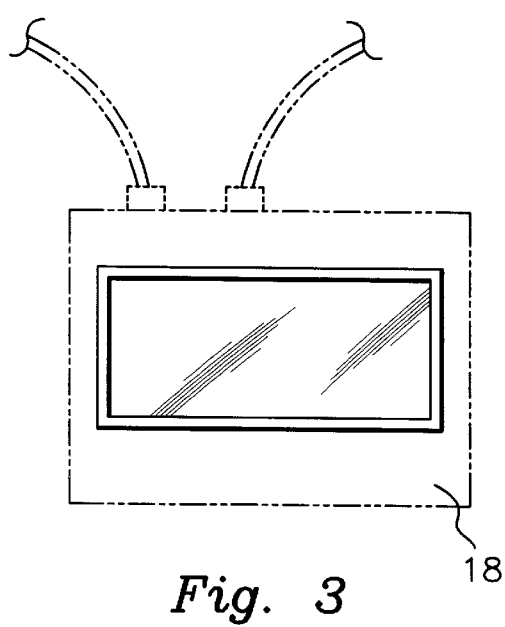
FIG. 3 is a top view of the present invention wherein the display is mounted on a caller identification box.
Figure 4:
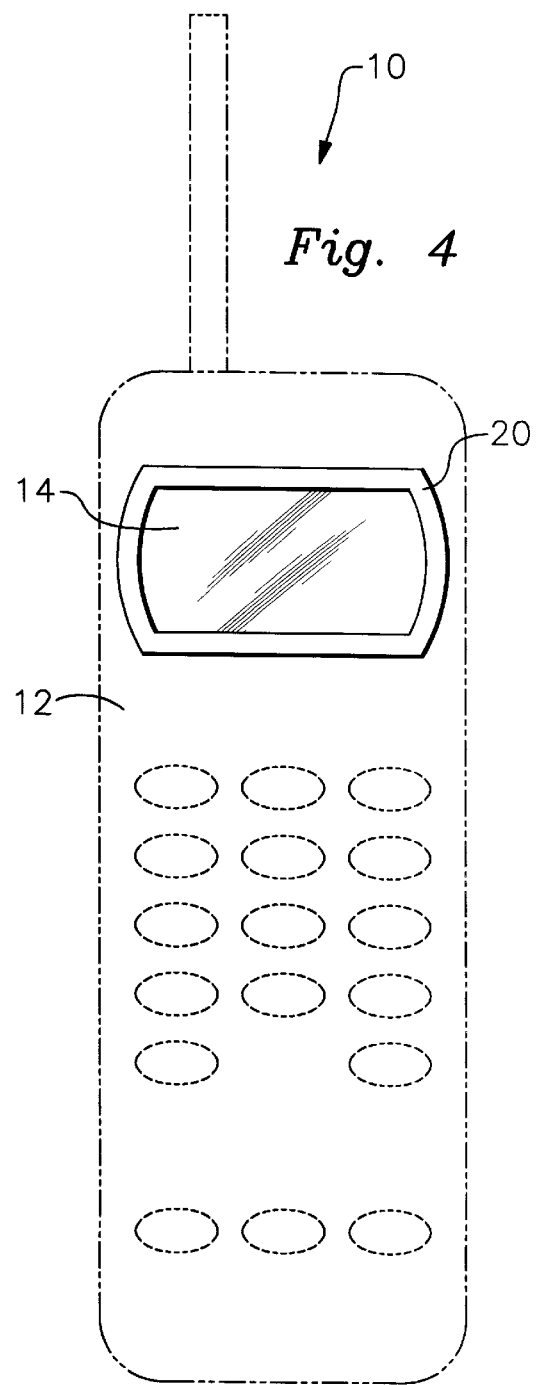
FIG. 4 is a top view of the present invention wherein the display is mounted on a cellular phone.

FIG. 2 shows a transparent magnifying lens 26 having a top surface, a bottom surface, and a periphery formed therebetween which has a rectangular configuration. The periphery of the lens is coupled along the inner surface of each member of the frame. The top and bottom surfaces are convex and each define a portion of cylinder whose axis runs parallel along a length of the display. A central extent of the top and bottom surfaces define a common thickness along a length of the lens. It should be noted that such thickness is equal to a height of the frame. As an option, the upper surface may be equipped with a predetermined degree of tint. Further, both the lens and frame are preferably constructed from a plastic such that the same may be cut to conform to the shape of the display Finally, an adhesive 28 is positioned along an entire bottom surface of each of the members of the frame. By this structure, the frame may be secured about a periphery of the display such that the lens resides above the same to magnify the numbers displayed thereon.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cellular phone magnification system comprising, in combination:

a cellular phone having a rectangular configuration with a front face, a rear face, and thin periphery formed therebetween, the front face having a generally rectangular liquid crystal display mounted thereon for displaying phone numbers dialed;

a frame having a rectangular configuration defined by an elongated top and bottom member and a pair of short side members mounted therebetween, each member having a common vertical cross-section, an inner surface, an outer surface, a top surface, and a bottom surface;

a transparent magnifying lens having a top surface, a bottom surface, and a periphery formed therebetween which has a rectangular configuration, the periphery of the lens coupled along the inner surface of each member of the frame, the top and bottom surfaces each defining a portion of cylinder whose axis runs parallel along a length of the display, a central extent of the top and bottom surfaces having a common thickness along a length of the lens with such thickness being equal to a height of the frame; and an adhesive lining an entire bottom surface of each of the members of the frame, wherein the frame may be secured about a periphery of the display such that the lens resides above the same to magnify the numbers displayed thereon.

2. A magnification system comprising:

a display;

a frame having a rectangular configuration defined by an elongated top and bottom member and a pair of short side members mounted therebetween, each member having a common vertical cross-section, an inner surface, an outer surface, a top surface, and a bottom surface;

a transparent magnifying lens having a top surface, a bottom surface, and a periphery formed therebetween coupled within the frame; and an adhesive lining an entire bottom surface of the frame, wherein the frame may be secured about a periphery of the display such that the lens resides above the same to magnify the numbers displayed thereon.

3. A magnification system as set forth in claim 2 wherein the display is situated on a cellular phone.

4. A magnification system as set forth in claim 2 wherein the display is situated on a pager.

5. A magnification system as set forth in claim 2 wherein the display is situated on a caller identification unit.

6. A magnification system as set forth in claim 2 wherein the top and bottom surfaces of the lens each define a portion of cylinder whose axis runs parallel along a length of the display.

7. A magnification system as set forth in claim 2 wherein a central extent of the top and bottom surfaces of the lens has a common thickness along a length of the lens with such thickness being equal to a height of the frame.

8. A cellular phone magnification system comprising, in combination:

a cellular phone having a front face, a rear face, and periphery formed therebetween, the front face having a liquid crystal display mounted thereon for displaying characters;

a frame having an elongated top and bottom member and a pair of side members mounted therebetween, each member having an inner surface, an outer surface, a top surface, and a bottom surface;

a transparent magnifying lens having a top surface, a bottom surface, and a periphery formed therebetween, the periphery of the lens coupled along the inner surface of each member of the frame, the top and bottom surfaces each having a convex shape, a central extent of the top and bottom surfaces having a common thickness along a length of the lens; and wherein the frame is secured about a periphery of the display such that the lens resides above the display to magnify the characters displayed thereon.

9. A magnification system as set forth in claim 8 further comprises an adhesive lining an entire bottom surface of each of the members of the frame.

\* \* \* \* \*